Figure 1:
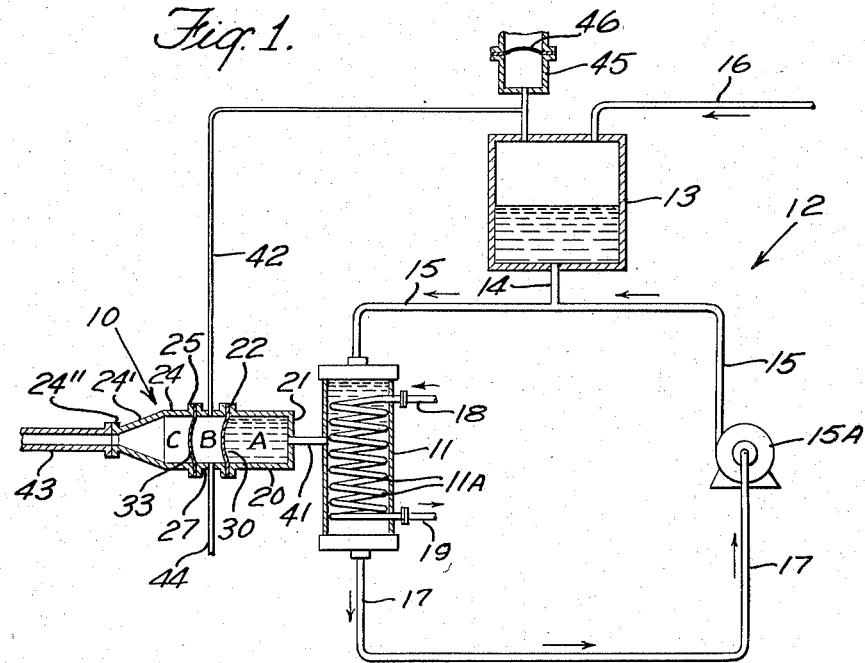

July 21, 1959

A. BELL 2,895,492

PRESSURE SAFETY DEVICE

Filed Dec. 19, 1955

INVENTOR
ALAN BELL
BY
E. Francis Wentworth Jr.
ATTORNEY

2,895,492
PRESSURE SAFETY DEVICE

Alan Bell, Sutton Courtnay, England, assignor to Foster Wheeler Corporation, New York, N.Y., a corporation of New York Application December 19, 1955, Serial No. 554,065

2 Claims. (Cl. 137—68)

This invention relates to pressure safety devices, and more particularly to bursting disc safety devices.

In fluid heat exchange apparatus having a heat exchanger for effecting indirect transfer of heat between a liquid at relatively low pressure, such as liquid metal, and a fluid at relatively high pressure, such as steam, there is ever present the danger of failure of the wall separating the fluids in the heat exchanger which causes violent discharge of a large volume of high pressure fluid into the relatively incompressible liquid. The violent discharge of high pressure fluid into the liquid creates a pressure shock wave beyond the capacity of safety valves disposed in the liquid side of the fluid heat exchange apparatus, thereby resulting in damage to the liquid side of the apparatus.

To protect the liquid side of a fluid heat exchange apparatus from severe damage resulting from the aforesaid shock wave and without constructing the liquid side of the apparatus of extra heavy gage material to withstand the maximum pressure in the fluid side of the apparatus, it has been proposed that a disc or diaphragm of thin metal be provided across the flow area of an unrestricted discharge pipe, the discharge pipe being in communication with the liquid side of the apparatus. The disc or diaphragm is constructed to rupture at the maximum safe pressure to be withstood by the liquid side of the apparatus.

A disadvantage of the proposed bursting disc safety device is that the disc is continuously subjected to flexing by the working pressure of the liquid side of the apparatus, which flexing causes weakening and premature failure of the disc.

In accordance with the present invention, a bursting disc safety device is provided in a fluid heat exchange apparatus and comprises a fluid conducting shell member having one end in communication with the liquid side of the apparatus and the opposite end with an unrestricted discharge pipe. Two rupturable discs or diaphragms are secured, in spaced relationship to each other, across the flow area of the shell member. The space between the two discs is maintained at a pressure substantially equal to the working pressure of the liquid side of the apparatus by means of a high impedance line which communicates with the gas space of a surge tank, arranged in the liquid side of the apparatus. One of the discs is in contact with the liquid in the liquid side of the heat exchanger and is constructed to rupture at a pressure equal to the difference between the working pressure of the liquid side of the apparatus and the maximum safe pressure which the liquid side of the apparatus is constructed to withstand; the other disc ruptures at the maximum safe pressure of the liquid side of the apparatus.

Under normal operating conditions, the disc in contact with the liquid is relatively free from flexing since the pressure on each side thereof is maintained substantially the same. Slight corrosion of the disc in contact with the liquid does not lead to premature failure. However, in the event of a premature failure of the disc in contact with the liquid, the liquid will be contained by the other disc and is not lost from the apparatus before repairs can be accomplished.

Figure 2:
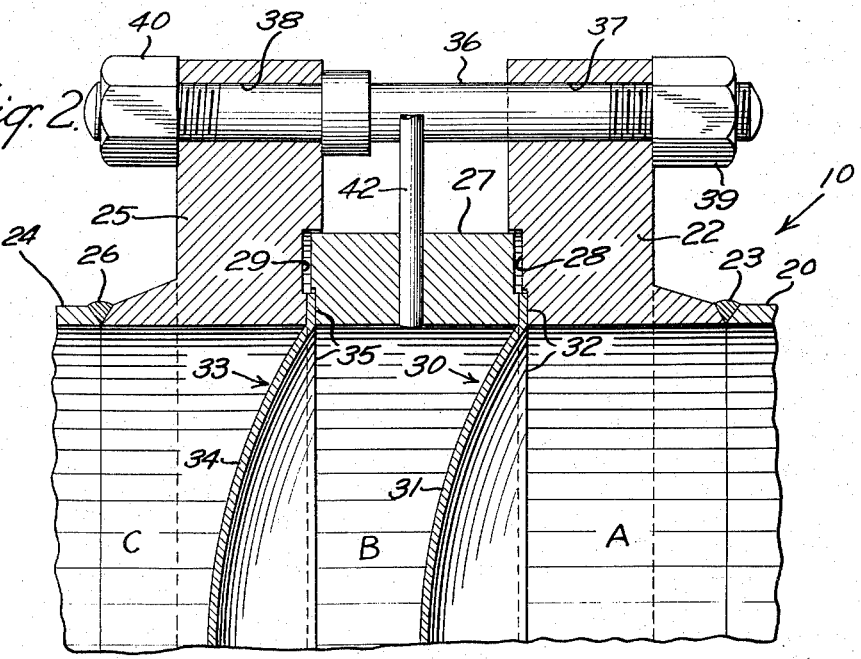

The invention will be understood from the following description when considered in connection with the accompanying drawing forming a part thereof and in which:

Fig. 1 is a view, in section, of a bursting disc safety device according to the present invention and which device is connected to a fluid heat exchange apparatus partly shown; and Fig. 2 is an enlarged fragmentary view, in section, of the bursting disc safety device shown in Fig. 1.

Referring to the drawings, 10 designates a bursting disc safety device, constructed in accordance with this invention, which is connected to an indirect heat exchanger 11, such as a conventional shell and tube heat exchanger, which is arranged in and is a part of a fluid heat exchange apparatus 12, partly shown in Fig. 1. Heat exchanger 11 communicates with a liquid space of a liquid expansion or surge tank 13 through lines 14 and 15 to receive a liquid metal, as for example molten sodium. The molten sodium is maintained under a relatively low working pressure by an inert gas, for example, neon, argon, or nitrogen, supplied to the gas space of surge tank 13 from a suitable source (not shown), through a line 16. A line 17 is connected to the bottom of heat exchanger 11 to conduct liquid therefrom. A tubular coil 11A is disposed in heat exchanger 11 and in the path of flow of liquid flowing through heat exchanger 11. An inlet conduit 18 is connected to the upper end of tubular coil 11A to deliver a fluid at high pressure, as for example steam, to the tubular coil. An outlet conduit 19 is connected to the lower end of tubular coil 11A to receive high pressure fluid after it has passed in indirect heat exchange relationship, in tubular coil 11A, with the liquid flowing through heat exchanger 11. A pump 15A is connected to lines 15 and 17 to continuously circulate liquid through the heat exchanger 11.

Bursting disc safety device 10 comprises a cylindrical shell member 20 which is closed at one end by a wall 21 (Fig. 1) and has a flange member 22 secured to the opposite end thereof in any suitable manner, as for example, by welding at 23 (Fig. 2). A second shell member 24 is provided at one end with a flange member 25, similar to flange member 22, which may be formed integral with shell member 24 or welded thereto, as shown at 26 (Fig. 2), and has at the other end a frusto-conical end portion 24' which tapers inwardly to a flanged end 24" (Fig. 1). Shell member 24 is disposed in longitudinal alignment with shell member 20, with flange member 25 adjacent flange member 22 of shell member 20. Interposed between shell members 20 and 24 is a spacing ring 27 which is adapted to fit within annular recesses 28 and 29 formed in the respective flange members 22 and 25.

A disc or diaphragm 30 of thin metal or other suitable material, hereinafter referred to as the liquid disc, has a dish shaped body portion 31 and a flat annular or peripheral lip 32. Disc 30 is disposed transversally of shell member 20, with peripheral lip 32 positioned between spacing ring 27 and flange member 22. Liquid disc 30 is constructed to rupture at a pressure which is equal to the difference between the working pressure of the liquid side of fluid heat exchange apparatus 12 and the maximum safe pressure which the liquid side of the apparatus is to withstand. A second disc or diaphragm 33, hereinafter referred to as the backing disc, is similar to disc 30 and has a dish shaped body portion 34 with a flat peripheral lip 35. Disc 33 is positioned transversally of shell member 24, with peripheral lip 35 disposed between spacing ring 27 and flange member 25. Backing disc 30 is constructed to rupture at a pressure which is equivalent to the maximum safe pressure of the liquid side of the fluid heat exchange apparatus 12.

Liquid disc 30 is made of any suitable material which is resistant to the corrosive action of the liquid in the liquid side of apparatus 12, while backing disc 33 is made of any suitable material without regard to its resistance to the corrosive action of the liquid. However, where molten sodium is employed in the liquid side of apparatus 12 it is preferable to make liquid disc 30 of nickel.

Shell members 20 and 24 are secured together by a plurality of studs 36 (one of which is shown in Fig. 2) which pass through aligned holes 37 and 38 arranged in spaced peripheral relationship in the respective flange members 25 and 22. Studs 36 are threaded at both ends to receive nuts 39 and 40 which, when threaded upon studs 36, draw flange members 22 and 25 toward spacing ring 27 to slamp the liquid disc 30 between the latter and flange member 22, and backing disc 33 between spacing ring 27 and flange member 25. The foregoing clamped assembly forms a fluid and pressure tight joint.

Liquid disc 30 and backing disc 33 are spaced from each other by spacing ring 27 to divide the flow area of the assembled shell members 20 and 24 into three chambers, A, B, and C. Chamber A is formed between liquid disc 30 and wall 21 of shell member 20, which chamber is in communication with the interior of heat exchanger 11 by means of conduit 41 (Fig. 1). Conduit 41 is secured at one end to wall 21 of shell member 20 and at the opposite end to heat exchanger 11 to communicate chamber A with the liquid flowing through heat exchanger 11, whereby chamber A is filled with liquid and is under a pressure corresponding to the working pressure of the liquid side of fluid heat exchange apparatus 12. Chamber B is formed between liquid disc 30 and backing disc 33 and is maintained at the working pressure of the liquid side of the fluid heat exchange apparatus through a high impedance line 42 which is secured at one end to spacing ring 27 and at the other end to the gas space of surge tank 13 (Fig. 1). Chamber C is formed to the left of backing disc 33, as viewed in Figs. 1 and 2, and communicates with an unrestricted discharge pipe 43 (Fig. 1) which is connected to flanged end 24" of shell member 24.

In operation, liquid, as for example molten sodium, is circulated by pump 15A through heat exchanger 11 by way of lines 15 and 17. The liquid is subjected to a relatively low working pressure by an inert gas supplied to surge tank 13 through gas line 16. Chamber A, being in communication with the liquid side of fluid heat exchange apparatus 12 in heat exchanger 11, is also subjected to the working pressure of the liquid side of fluid heat exchange apparatus 12. Chamber B is maintained at substantially the same pressure as the working pressure of the liquid by way of high impedance line 42 which connects chamber B with the gas supply in the gas space of surge tank 13. Since the pressure in chamber B is maintained at substantially the working pressure in chamber A, liquid disc 30 is not subjected to differential pressures which would cause flexing of liquid disc 30 and its eventual failure due to a weakening of the material of the disc. Simultaneously, with the flow of liquid through heat exchanger 11, a fluid, as for example steam, is delivered to tubular coil 11A of heat exchanger 11 through conduit 18 at a relatively high pressure. The steam passes through tubular coil 11A in indirect heat exchange relationship with the liquid in heat exchanger 11 and flows therefrom through conduit 19.

To more clearly understand the operation of the present invention, let it be assumed that the liquid side of fluid heat exchange apparatus 12 is subjected to a working pressure of 40 p.s.i. gage and is constructed to withstand a maximum safe pressure of 130 p.s.i. gage.

Liquid disc 30 has a thickness whereby the disc ruptures at 90 p.s.i. gage, that is, the difference between the maximum safe pressure (130 p.s.i. gage) and the working pressure (40 p.s.i gage). Rupture of liquid disc 30 will occur under the aforesaid values, when the pressure in chamber A exceeds 130 p.s.i. gage whereby a pressure differential across liquid disc 30 of a value in excess of 90 p.s.i gage is provided. That is, with a pressure of 40 p.s.i. gage in chamber B exerting against one side of liquid disc 30, the pressure in chamber A must exceed a pressure having a value above 90 p.s.i. gage plus the pressuer in chamber B to cause rupture of liquid disc 30. Accordingly, backing disc 33 would then have a thickness whereby it ruptures at 130 p.s.i. gage, which pressure is the maximum safe pressure of the liquid side of fluid heat exchange apparatus 12.

In the event of failure of the tubular coil 11A, high pressure fluid, as for example steam, escapes therefrom into the liquid flowing through heat exchanger 11. The rapid escape of high pressure fluid into the liquid causes a rapid rise in pressure in the liquid side of heat exchange apparatus 12 and a corresponding rapid rise in pressure in chamber A. The pressure in chamber B remains at a pressure substantially equal to the working pressure of the liquid, as for example 40 p.s.i. gage, since high impedance line 42 prevents rapid transmission of pressure changes to chamber B. When the pressure in chamber A exceeds the maximum safe pressure of the liquid side of heat exchange apparatus 12, as for example 130 p.s.i. gage, liquid disc 30 ruptures, followed almost immediately by backing disc 33. Liquid disc 30, because it is constructed to rupture at a pressure equal to the difference between the maximum safe pressure and the working pressure, as for example 90 p.s.i. gage, ruptures when the pressure in chamber A exceeds a value above the maximum safe pressure, as for example 130 p.s.i. gage, since the pressure differential across liquid disc 30 at 130 p.s.i. gage in chamber A is at a value above 90 p.s.i. gage (130 p.s.i. gage in chamber A minus 40 p.s.i. gage in chamber B). Upon rupture of liquid disc 30 and backing disc 33, the pressure in the liquid side of heat exchange apparatus is relieved by release of liquid through unrestricted discharge pipe 43. Discharge pipe 43 has a capacity such that the pressure is released sufficiently rapidly therethrough so as to prevent a dangerous rise in pressure in the liquid side of apparatus 12 to a point above the maximum safe pressure.

In the event of premature rupture of liquid disc 30, liquid leaking from chamber A is contained in chamber B by backing disc 33. To detect this premature leakage, a line 44 is connected to spacing ring 27 (Fig. 1) and to a leak detecting device (not shown).

As further protection against damage by high pressure in the liquid side of fluid heat exchange apparatus 12, another bursting disc safety device 45 is connected to the gas space of surge tank 13. Bursting disc device 45, is provided with a single rupturable disc 46, as shown in Fig. 1, which is constructed to rupture at the maximum safe pressure of the liquid side of the apparatus and acts as a safety valve.

Although the invention has been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. A fluid heat exchange system having a heat exchanger communicating with a surge tank to receive a first fluid maintained under a relatively low pressure by a gaseous fluid introduced into a vapor space of said surge tank, the heat exchanger including means to receive a second fluid under relatively high pressure and pass the second fluid in indirect heat exchange relationship with said low pressure fluid, in combination with a pressure safety device comprising a housing communicating at one end with the atmosphere, a first diaphragm disposed in said housing, a second diaphragm disposed in said housing and in spaced relationship with said first diaphragm to divide the housing into a first and second fluid-tight compartment and a third compartment communicating with the atmosphere, means communicating the first compartment with said heat exchanger to receive therein low pressure fluid from the heat exchanger, a high impedance line communicating at one end with said second compartment formed between said first and second diaphragms and at the other end with the vapor space of said surge tank to conduct gaseous fluid into said second compartment whereby the pressure in said second compartment is substantially equal to the pressure of said low pressure fluid, said first and second diaphragms being rupturable when the pressure of said low pressure fluid in said fluid heat exchanger and in said first compartment attains a value exceeding the maximum safe operating pressure of the heat exchange system for causing flow of low pressure fluid from said first compartment through said second and third compartments to atmosphere thereby relieving pressure upon said heat exchange system.

2. A fluid heat exchange system having a heat exchanger communicating with a surge tank to receive a heated liquid metal maintained under a relatively low pressure by a gaseous fluid inert with respect to the liquid metal supplied into the vapor space of said surge tank, the heat exchanger including means to receive a fluid under relatively high pressure and pass the high pressure fluid in indirect heat exchange relationship with said liquid metal, in combination with a pressure safety device comprising, a housing, a first thin metal diaphragm disposed in said housing, a second thin metal diaphragm disposed in said housing and in spaced relationship with said first diaphragm to divide the housing into a first, second and third fluid-tight compartment and a third compartment communicating with the atmosphere, a conduit communicating at one end with said first compartment and at the opposite end with the heat exchanger to receive and conduct liquid metal from the latter into the first compartment, a high impedance line communicating at one end with the second compartment formed between said first and second diaphragms and at the opposite end with the vapor space of said surge tank to receive and conduct the gaseous fluid from the latter to said second compartment whereby said second compartment is maintained at a pressure substantially equal to the pressure of the liquid metal in said first compartment, an unrestricted discharge conduit communicating with the third compartment, said first and second thin metal diaphragms being adapted to rupture when the pressure of said liquid metal in the heat exchanger and in said first compartment attains a value exceeding the maximum safe operating pressure of the heat exchange system for releasing liquid metal from the first compartment through said second and third compartments and through said unrestricted discharge conduit.

References Cited in the file of this patent
UNITED STATES PATENTS

| | | |
|---|---|---|
| 1,018,489 | Graf | Feb. 27, 1912 |
| 2,346,727 | Camp | Apr. 18, 1944 |
| 2,387,353 | Raymond | Oct. 23, 1945 |
| 2,669,435 | Cord et al. | Feb. 16, 1954 |
| 2,788,794 | Holinger | Apr. 16, 1957 |